United States Patent [19]

Kalibjian

[11] Patent Number: 5,335,548
[45] Date of Patent: Aug. 9, 1994

[54] NON-LINEAR OPTICAL CRYSTAL VIBRATION SENSING DEVICE

[75] Inventor: Ralph Kalibjian, Livermore, Calif.

[73] Assignee: The United States of America as represented by the Department of Energy, Washington, D.C.

[21] Appl. No.: 901,289

[22] Filed: Jun. 19, 1992

[51] Int. Cl.$^5$ .................... G01H 1/00; G01H 9/00
[52] U.S. Cl. .......................... 73/655; 73/657; 356/354; 356/349; 359/240
[58] Field of Search .............. 73/655, 657; 356/354, 356/349, 360, 350; 359/240

[56] References Cited

U.S. PATENT DOCUMENTS

| | | | |
|---|---|---|---|
| 4,422,331 | 12/1983 | Walker | 73/517 |
| 4,466,738 | 8/1984 | Huang et al. | |
| 4,471,659 | 9/1984 | Udd et al. | 73/657 |
| 4,703,992 | 11/1987 | Yeh | 350/3.64 |
| 4,773,739 | 9/1988 | Valley et al. | 398/354 |
| 4,784,473 | 11/1988 | Gookin | 350/355 |
| 4,834,111 | 5/1989 | Khanna et al. | 73/627 |
| 4,879,723 | 11/1989 | Dixon et al. | 372/21 |
| 4,900,919 | 2/1990 | Twerdochlib | 250/227 |
| 4,956,568 | 9/1990 | Su et al. | 307/352 |
| 5,131,748 | 7/1992 | Monchalin et al. | 73/657 |

FOREIGN PATENT DOCUMENTS 0009108  8/1979  European Pat. Off. ....... H01S 3/10

OTHER PUBLICATIONS

Kalibjian, Ralph, "Vibration Sensing In A Four-Wave Mixing Geometry At 633-NM In BATI03", Sep. 19, 1991, UCRL-JC108742.

Sasaki, O. "Laser Doppler Vibration Measuring System Using Bispectral Analysis", *Applied Optics*, vol. 19, No. 1 (Jan. 01, 1980), pp. 151–153.

*Primary Examiner*—Hezron E. Williams
*Assistant Examiner*—Helen C. Kwok
*Attorney, Agent, or Firm*—Miguel A. Valdes; Roger S. Gaither; William R. Moser

[57] ABSTRACT

A non-linear optical crystal vibration sensing device (10) including a photorefractive crystal (26) and a laser (12). The laser (12) produces a coherent light beam (14) which is split by a beam splitter (18) into a first laser beam (20) and a second laser beam (22). After passing through the crystal (26) the first laser beam (20) is counter-propagated back upon itself by a retro-mirror (32), creating a third laser beam (30). The laser beams (20, 22, 30) are modulated, due to the mixing effect within the crystal (26) by vibration of the crystal (30). In the third laser beam (30), modulation is stable and such modulation is converted by a photodetector (34) into a usable electrical output, intensity modulated in accordance with vibration applied to the crystal (26).

16 Claims, 3 Drawing Sheets

NON-LINEAR OPTICAL CRYSTAL VIBRATION SENSING DEVICE

The invention described herein arose in the course of, or under, contract No. DE-AC03-S9SF18433 between the United States Department of Energy and Lawrence Livermore National Laboratory.

BACKGROUND OF THE INVENTION

The present invention relates generally to vibration sensing apparatus, and more particularly to a means for sensing vibration in a non-linear optical crystal using laser beams.

A great variety of means and methods for sensing vibration have been developed. An example is found in U.S. Pat. No. 4,471,659, issued to Udd et al. Some of these have taken advantage of the properties of crystals, such as that disclosed in U.S. Pat. No. 4,900,919, issued to Twerdochlib. Other methods for detecting vibration have utilized coherent light beams, such as the method described in U.S. Pat. No. 4,466,738, issued to Huang et al.

A heretofore essentially unrelated field has been that concerning the properties of wave mixing within a photorefractive crystal. Various adaptions and applications concerning this property have been devised, such as that disclosed in U.S. Pat. No. 4,703,992, issued to Yeh. Wave mixing occurs when, in a crystal, two intersecting laser beams form an intensity interference pattern which creates a refractive index grating via the electro-optic effect in the photorefractive crystal. The grating is a periodic variation in the index of refraction of the crystal.

It happens that, in conventional two wave-mixing, vibrations in the laser beam and the crystal cause transient variation in the effective gain, which results in fading and distortion in an output signal. Therefore, it has been thought that no useful signal could be derived from the wave mixing property inherent in photorefractive crystals which could be useful for accurately and reliably providing an output signal modulated according to vibrations of the crystal.

Clearly, if the wave mixing properties of a crystal could be utilized to provide an output modulated by vibration of the crystal, then there would be attendant advantages. Among the advantages would be the inherent precision of measurement of the laser interferometric principles involved, and the ability to produce a small and rugged vibration sensor the output of which could be transmitted through optical fibers to detector apparatus. However, the instabilities associated with wave mixing have reduced the usefulness of the application of this principle such that, to the inventor's knowledge, nor prior art method has been developed to sense vibrations in a crystal using wave mixing principles.

No prior art, to the inventor's knowledge, has successfully provided a stable laser output modulated by vibrations in a crystal, and all previous applications have resulted in output signals which suffer from unwanted distortion and fading.

SUMMARY OF THE INVENTION

Accordingly, it is an object of the present invention to provide a vibration sensor that is accurate and reliable in operation.

It is another object of the present invention to provide a vibration sensor that can be placed in a small package.

It is still another object of the present invention to provide a vibration sensor which provides a stable output signal.

It is yet another object of the present invention to provide a vibration sensor which takes advantage of the inherent accuracies of laser interferometry for detecting vibration.

It is still another object of the present invention to provide a vibration sensor which can be placed at a remote location and information sent therefrom by means fiber optic transmission.

Briefly, the preferred embodiment of the present invention is a vibration sensor which utilizes wave-mixing properties of coherent laser beams in a photorefractive crystal. Vibrations of the crystal, itself, are what is detected by the laser beams. Vibrations of the crystal cause two intersecting laser beams to form an intensity interference pattern which creates a refractive index grating via the electro-optic effect in the photorefractive crystal. Energy transfers from one beam to the other, thus amplifying one beam at the expense of the other. The beam coupling gain coefficient is dependent not only upon the crystal properties, but also on externally applied electrical and mechanical forces on the crystal. A vibrational force on the crystal perturbs the position and the velocity of the interference pattern relative to the quasi-stationary grating within the crystal. The redistribution of the internal charges in the crystal modulates the gain coefficient and, thereby, intensity modulates both beams. With no external bias on the crystal, the vibration signal in a two-wave mixing geometry is highly unstable, whereas the vibration signal remains stable in a "four-wave" mixing geometry. Problems inherent in two wave mixing can be minimized by applying a velocity bias to the crystal. Such bias can be applied externally, as for instance by Doppler shifting either of the input laser beams or by applying an electrical bias field to the crystal itself, and such methods for accomplishing the bias are within the scope of the present invention. However, in the best presently known embodiment of the invention the bias is created internally within the crystal by operation of retro-reflecting one of the laser beams back into the crystal in a "four-wave" mixing geometry. Internal biasing can be performed best, for example, in a 4-mm class crystal, when the two primary laser beams mix contra-directionally in the C axis orientation of the crystal.

An advantage of the present invention is that it provides stable operating conditions such that the wave mixing properties of a crystal can be utilized as a vibration sensor.

A further advantage of the present invention is that signal fading and harmonic distortion within the crystal are minimized.

Yet another advantage of the present invention is that information can be transmitted from the vibration sensor by means of a fiber optic line.

Still another advantage of the present invention is that a very accurate means of modulation a signal according to vibrations is provided.

Yet another advantage of the present invention is that a vibration sensor according to the present invention can be put into a very small package.

Still another advantage of the present invention is that a vibration sensor according to the present invention is rugged and reliable in operation.

These and other objects and advantages of the present invention will become clear to those skilled in the art in view of the description of the best presently known mode of carrying out the invention and the industrial applicability of the preferred embodiment, as described herein and as illustrated in the several figures of the drawing.

DETAILED DESCRIPTION OF THE INVENTION

Figure 1:
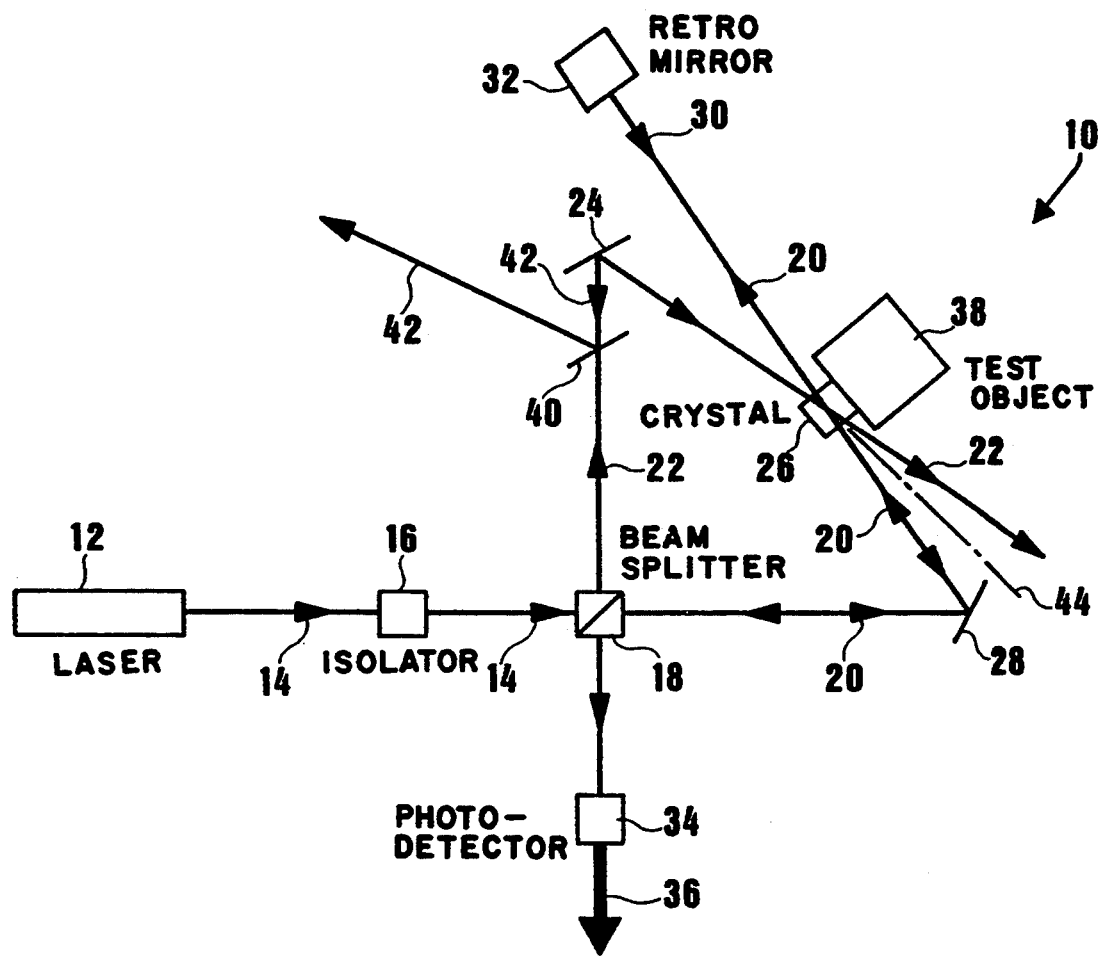
FIG. 1 is non-linear optical crystal vibration sensing device, according to the present invention.

The best presently known mode for carrying out the invention is a non-linear optical crystal vibration sensing device 10 having a HeNe laser 12 which outputs therefrom a coherent light beam 14 through an isolator 16. The isolator 16 is a conventional device which prevents feedback into the laser 12, which would otherwise cause instability in the operation of the laser 12. The coherent light beam 14 then passes into a beam splitter 18 which splits the coherent light beam 14 into a first laser beam 20 and a second laser beam 22. The second laser beam 22 is redirected by a first mirror 24 into and through a photorefractive crystal 26. The first laser beam is redirected by a second mirror 28 into and through the crystal 26. The two laser beams 20 and 22 intersect within the crystal 26. Having passed through the crystal 26, the first laser beam is counter-propogated back upon itself as a third laser beam 30 by a retro-mirror 32. The third laser beam 30, again, passes through the crystal 26, and is redirected by the second mirror 28 toward the beam splitter 18.

The third laser beam 30 is then redirected by the beam splitter 18 into a photodetector 34. As will be recognized by one skilled in the art, in fact, only a portion of the third laser beam 30 is redirected by the beam splitter 18 into the photodetector 34, and part of the third laser beam 30 will pass through the beam splitter 18 toward the laser 12. Indeed, this is the primary reason making desirable the inclusion of the isolator 16 in the best presently known embodiment 10 of the present invention since, without the isolator 16, that portion of the third laser beam 30 which passes through the beam splitter 18 toward the laser 12 might interfere with the stable operation of the laser 12.

The photodetector provides an electrical output 36 which may be provided to a wave analyzer (not shown) or to an audio or visual detection means, as may be appropriate to the usage to which the non-linear optical crystal vibration sensing device 10 is being applied.

In the best presently known embodiment 10 of the invention, the crystal 26 is attached to a test object 38, which, in the case of the example of FIG. 1, is a shaker table. Vibrations in the test object are transferred to the crystal 26 and modulate the third laser beam 30, as will be described hereinafter. The test object 38, as used in conjunction with the best presently known embodiment 10 of the present invention, is representative of any body to which the crystal 26 may be attached for sensing vibrations and/or other movement therein.

Also provided in the best presently known embodiment 10 of the present invention is a partially reflective mirror 40 intersecting the path of the second laser beam 22, as illustrated in FIG. 1. Appearance of a phase conjugate beam 42, as illustrated, will assure proper alignment of the crystal 26 and the laser beams 20, 22 and 30. The phase conjugate beam 42 is produced within the crystal 26, as will be described in more detail, hereinafter.

Figure 2:
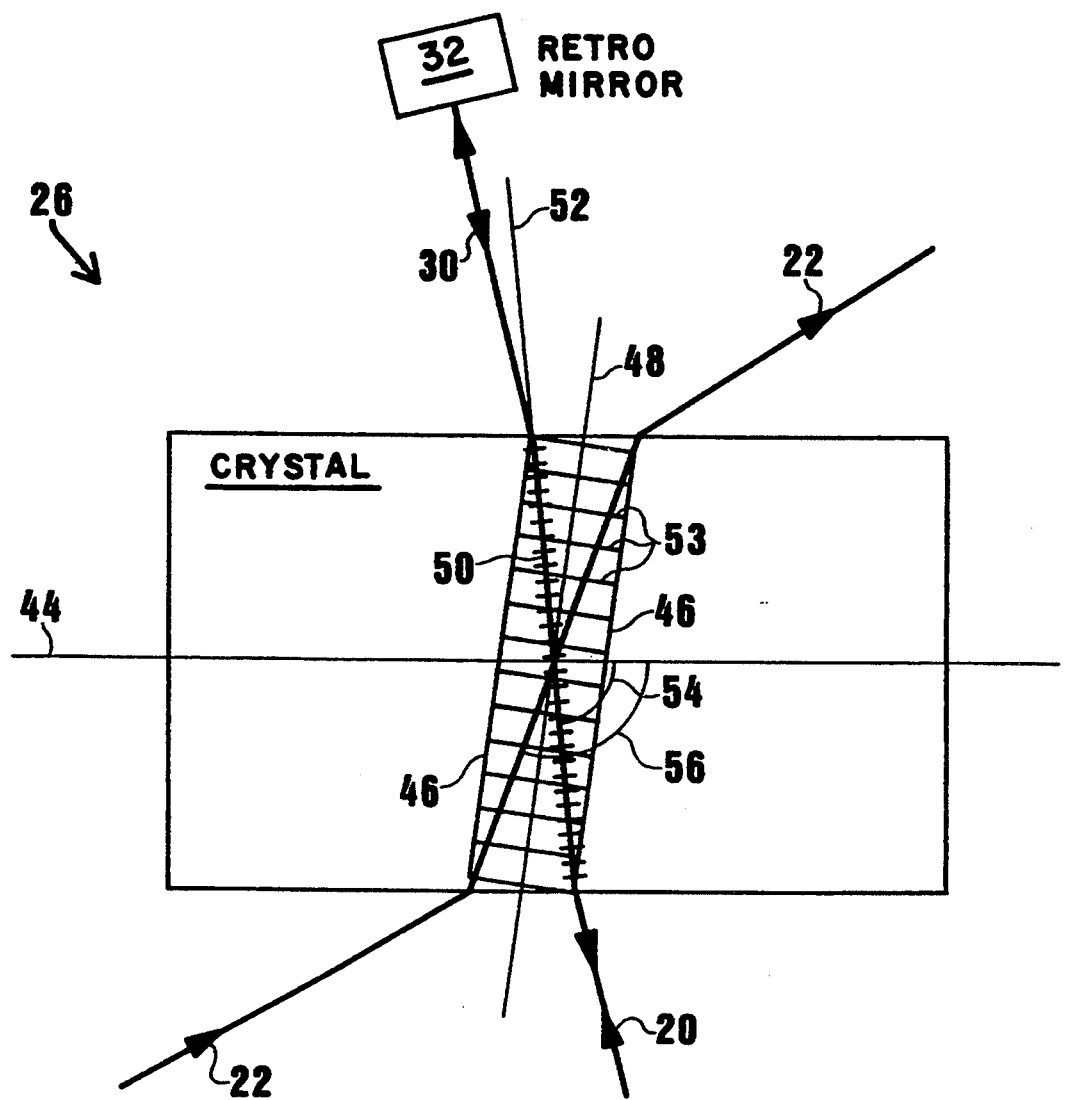
FIG. 2 is a detail of a crystal, showing the relationship of laser beams therein, according to the present invention.

FIG. 2 is a detailed drawing of the photorefractive crystal 26 of FIG. 1. The crystal 26 of the best presently known embodiment 10 of the present invention is a $BaTiO_3$ crystal, of the 4-mm class, although other crystal might be used to practice the invention. As will be described in more detail, hereinafter, optimal conditions are achieved when the laser beams 20 and 22 are mixed contradirectionally generally along a "C" axis 44 of the $BaTiO_3$ crystal 26. It should be noted that the position of the laser beams 20, 22 and 30 in relation to the crystal 26 and the "C" axis 44 thereof, as depicted in FIG. 2, are illustrative only, and the effects of those relationships will be discussed in more detail, herein. One skilled in the art will be familiar with the general requirements for wave mixing, including the coherency of the laser beams to be mixed.

As can be seen in the view of FIG. 2, refractive properties of the crystal 26 cause the first laser beam 20 and the second laser beam 22 to refract as they enter the crystal 26. In accordance with well known principles, the first laser beam 20 and the second laser beam 22 also refract again, generally to resume their original direction of travel, as they leave the crystal 26. As will be appreciated by one skilled in the art, a first grating 46 will be established by the mixing of the first laser beam 20 and the second laser beam 22. As is well known in the art, a grating such as the first grating 46 is a periodic variation in the index of refraction of the crystal 26, which periodic variation is slow to change relative to changes in the conditions which create it. The first grating 46 is arrayed along a first grating plane 48. The first grating plane 48 bisects the paths of the first laser beam 20 and the second laser beam 22 through the crystal.

As previously discussed in relation to FIG. 1, the retro-mirror 32 redirects the first laser beam 20 back upon itself, and the redirected beam is referred to, herein, as the third laser beam 30. A second grating 50 is formed by mixing of the first laser beam 20 and the third laser beam 30. Since the first laser beam 20 has been turned directly back upon itself by the retro-mirror 32, the third laser beam 30 travels the same path through the crystal 26 as does the first laser beam 20, except reversed 180° in direction, forming the second grating 50. Therefore, the second grating 50 is formed along a second grating plane 52 which is coincident with the path of the first laser beam 20 and the third laser beam 30. It should be noted that a third grating 53 will be formed perpendicular to the first grating 46 by the mixing of the second laser beam 22 and the third laser beam 30.

A small fraction of the third laser beam 30 scatters off of the first grating 46, which forms the phase conjugate beam 42. However, most of the third laser beam 30 passes back through the crystal 26 toward the photodetector 34. Any vibration of the crystal perturbs the position of the gratings 46, 50 and 53 with respect to the interference pattern within the crystal 26, which results in intensity modulation of the laser beams 20, 22 and 30. However, as has been discussed heretofore, such modulation is generally unstable, resulting in fading and harmonic distortion of the modulation. Nevertheless, the inventor has found that the portion of the third beam 30 which passes back though the crystal 26 and exits toward the photodetector 34 (FIG. 1) contains a modulation component that is stable and which accurately represents vibration induced within the crystal 26. Such modulation is converted to the electrical output signal 36 by conventional means within the photodetector 34. The electrical output signal 36 can then be provided for detection and/or analysis by any of the several conventional means for detection and/or analyzing such electrical signals.

Referring again to FIG. 2, a first beam angle 54 is the angle between the first laser beam 20 and the "C" axis 44 within the crystal 26, and a second beam angle 56 is the angle between the second laser beam 22 and the "C" axis within the crystal. The inventor has found that vibrational sensing stability is greatly enhanced, in the 4-mm class crystal, when the first laser beam 20 and the second laser beam 22 are mixed contra-directionally in the "C" axis 44 of the crystal 26. This occurs when the first beam angle 54 approaches 0° and the second beam angle 56 approaches 180°. However, to allow for the introduction of the retro-mirror 32, the second beam angle 56 is made a few degrees less than 180° in the best presently known embodiment 10 of the present invention.

Figure 3:
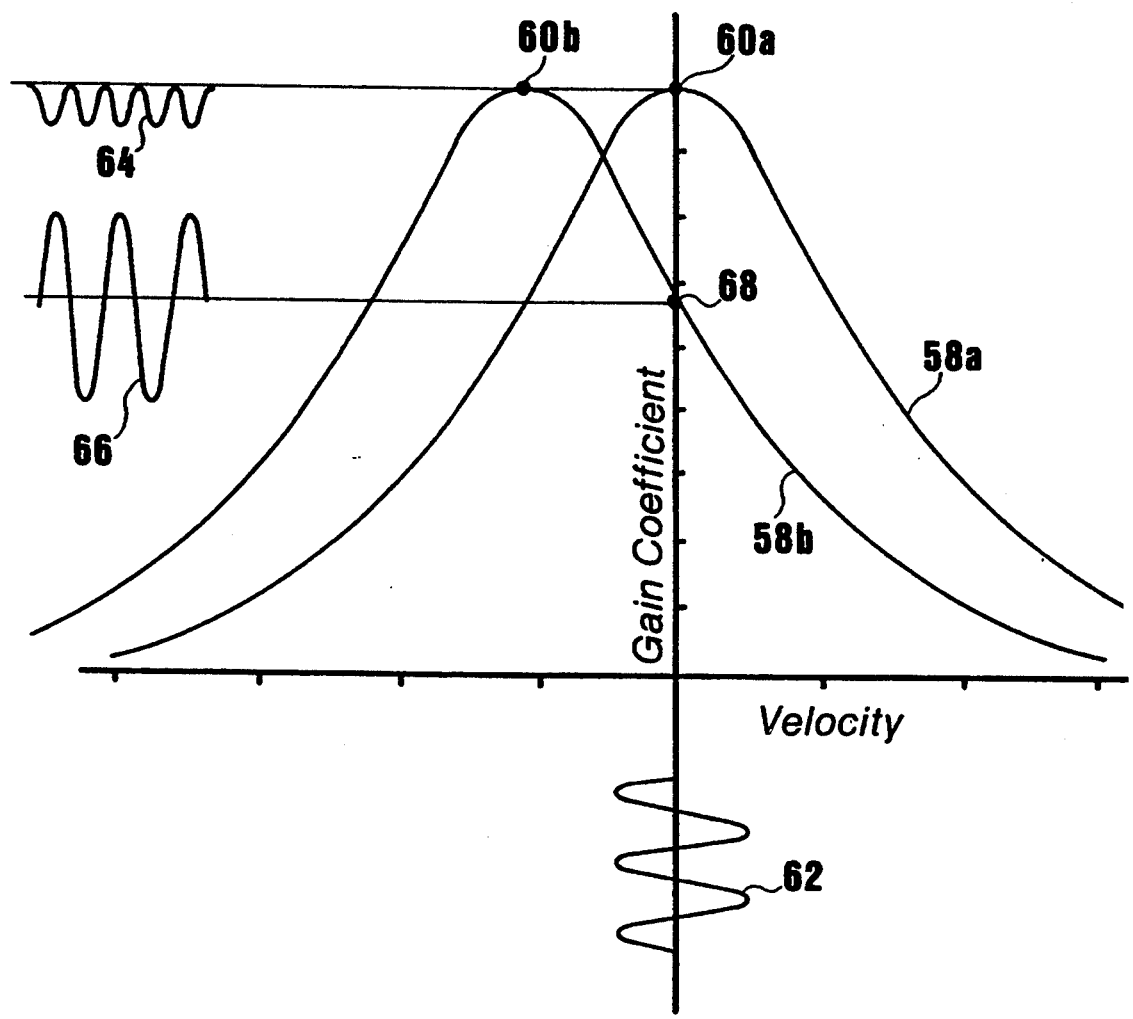
FIG. 3 is a graphic representation of crystal gain coefficient curves, showing the effect of velocity biasing, according to the present inventive method.

FIG. 3 is a graphic representation of gain coefficient curves 58a, and 58b, showing the effect of velocity biasing in the crystal 26 (FIG. 2), according to the present inventive method, wherein the x axis represents velocity and the y axis represents gain coefficient of the crystal 26. If, for example, only two laser beams were mixed in a crystal (not shown), which is referred to as two-wave mixing, a first velocity bias point 60a of an unbiased gain coefficient curve 58a is, nominally, at zero velocity, as is depicted in the graph of FIG. 3. This is the condition referred to as zero velocity bias. In this condition, an incoming physical vibrational wave 62 (which, as has been discussed in detail previously, herein, would physically vibrate the crystal 26 causing intermodulation of laser beams 20 and 22, therein) would produce a harmonically distorted first output signal 64 of twice the frequency of the incoming physical vibrational wave 62. Also, in this condition. varying vibrations from uncontrolled background sources, and the like, could give slight shifts in the velocity bias which could contribute to fading and distortion of the first output signal 64 as the sum of vibrations equilibrate to zero velocity. A second gain coefficient curve 58b is shown in a velocity biased position with a second velocity bias point 60b at a non-zero position. As has been discussed previously, herein, the inventor has found that, in the velocity biased condition as depicted by the second gain coefficient curve 58b, the incoming physical vibrational wave 62 will cause vibrations in the crystal 26 which result in an undistorted output signal 66. Furthermore, any slight bias shift due to background sources will not degrade the signal 66, since an operating bias point 68 is on the linear portion of the gain coefficient curve 60b.

It is known in the art that a velocity bias can be introduced into the crystal 26 (FIG. 2) by applying either an electric field to the crystal 26 or by Doppler-shifting the frequency of on incoming laser beam (not shown). As has been previously discussed, herein, it is an aspect of the present invention that such a velocity bias can produce the undistorted output signal 66 when the crystal 26 is vibrated. It is another aspect of the present invention that such a velocity bias can be internally generated in the crystal 26, without resorting to an external electric field or Doppler shift, by counter-propagating one of the laser beams 20 (FIG. 2) in a four-wave mixing geometry, as has previously been discussed in relation to FIG. 2. This is accomplished because internally created space-charge fields from the two major gratings 46 and 53 contribute a significant component of field onto the counter-propagating grating 50 which, in turn, provides for the velocity bias shift, as depicted in the shifted gain coefficient curve 60b of FIG. 3.

As is shown above, in great part, the non-linear optical crystal vibration sensing device 10 according to the present invention utilizes the known phenomenon of wave mixing in a heretofore unknown way to perform a function that has previously been thought inappropriate to the technology. Among the substantial differences are the inclusion of a velocity bias which, in the best presently known embodiment 10 of the invention is provided by the geometry and arrangement of the laser beams 20, 22 and 30 within the crystal 26, as described herein. Further among the substantial differences between the present invention and the prior art is the method of producing the velocity bias, as described herein. The components of the best presently known embodiment 10 of the present invention are commonly available, and no significant changes of materials are envisioned nor are any special constructions required.

Various modifications may be made to the invention without altering its value or scope. For example, while the best presently known embodiment of the invention utilizes an internal bias created within the crystal 26 by the laser beams 20, 22 and 30, any means for introducing a velocity bias might be utilized to achieve the purpose. Another change which might be made to the invention would be to substitute a different type of crystal for the class 4-mm crystal utilized in the best presently known embodiment 10 of the present invention, although changes in the geometries of the invention might be required to do so.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The non-linear optical crystal vibration sensing device 10 is intended for use in a variety of vibration sensing applications, such as contact microphones, accelerometers, velocimeters, hydrophones and seismometers. The non-linear optical crystal vibration sensing device can be placed in a small package, having a face of approximately one square centimeter, or even less. Therefore, it is anticipated that it will be particularly useful in remote sensors, especially where it is desirable that signal be carried from the sensor by means of fiber optic cables, such that electronic components can be placed at some distance from the source of vibration. The non-linear optical crystal vibration sensing device 10 can be substituted for other motion transducers in many applications wherein high precision is desired.

Since the non-linear optical crystal vibration sensing device 10 can be constructed such that there are no electronic components at the sensor site, it is anticipated that it will be particularly useful in applications wherein localized electronic components are either undesirable or inoperable, such as in explosive atmospheres, or where electromagnetic interference might disrupt the operation of electronic components, and the like.

The non-linear optical crystal vibration sensor 10 may be utilized in any application wherein conventional vibration sensors are used, and will provide increased sensitivity and accuracy as compared to comparable prior art devices. Therefore, it is expected that it will be acceptable in the field as a substitute for the conventional vibration and acceleration sensors. For these and other reasons, it is expected that the utility and industrial applicability of the invention will be both significant in scope and long-lasting in duration.

I claim:

1. An improved vibration sensor, comprising:
   a photorefractive crystal, said photorefractive crystal being positioned such that said photorefractive crystal is physically disturbed by vibrations which are to be sensed;
   a coherent light source for generating at least two laser beams;
   laser beam redirection means for redirecting the laser beams such that the laser beams each pass through said photorefractive crystal and further such that mixing of the laser beams occurs within said photorefractive crystal;
   photodetection means positioned for interception at least one of the laser beams at a position such that after the laser beam which is intercepted has passed through said photorefractive crystal, wherein:
   a velocity bias is imposed internally on said photorefractive crystal by the action of counter-propagating one of the laser beams back upon itself such that the laser beam which is counter-propagated passes twice through said photorefractive crystal.

2. The improved vibration sensor of claim 1, wherein:
   said photodetection means is positioned such that said photodetection means intercepts the counter-propagated laser beam after the counter-propagated laser beam is reflected back through said photorefractive crystal, after the counter-propagated laser beam has passed through said photorefractive crystal a second time.

3. The improved vibration sensor of claim 1, wherein: said photorefractive crystal is a class 4-mm crystal.

4. The improved vibration sensor of claim 1, wherein: the laser beams are mixed contra-directionally in relation to a "C" axis of the photorefractive crystal.

5. A transducer for modulating a light beam according to physical vibrations in a test object, comprising:
   a photorefractive crystal, said photorefractive crystal being physically connected to the test object such that vibrations of the test object are transferred to said photorefractive crystal;
   laser beam production and direction means for producing two laser beams and for directing the two laser beams into said photorefractive crystal such that the two laser beams mix in said photorefractive crystal creating an optical grating therein;
   photodetection means for intercepting at least one of the laser beams such that after the laser beam which is intercepted has passed through said photorefractive crystal, such that modulation of the laser beams can be detected and converted to an electrical signal, wherein;
   one of the two laser beams is counter-propagated back upon itself such that at least a portion of a counter-propagated laser beam passes a second time through said photorefractive crystal, with the remainder of the counter-propagated laser beam being deflected by optical grating.

6. The transducer of claim 5, wherein:
   said photodetection means is positioned such that said photodetection means intercepts the counter-propagated laser beam after the counter-propagated laser beam is reflected back through said photorefractive crystal.

7. The transducer of claim 5, wherein:
   said photorefractive crystal is a class 4-mm crystal.

8. The transducer of claim 5, wherein:
   said photorefractive crystal is a $BaTiO_3$ crystal.

9. The transducer of claim 5, wherein:
   the laser beams are directed by said laser beam production and direction means such that the laser beams enter said photorefractive crystal from generally opposite directions and further such that the laser beams enter said photorefractive crystal generally along a "C" axis of said photorefractive crystal.

10. A method for creating a velocity bias in a photorefractive crystal, comprising the steps of:
    directing two laser beams into a photorefractive crystal such that a refractive index grating is created thereby within the crystal;
    counter-propagating one of the laser beams back upon itself, after said counter-propagated said one of the laser beams
    has passed through the crystal such that a counter-propagated portion of that said counter-propagated one of the laser beams passes through the crystal.

11. The method of claim 10, wherein:
    the counter-propagated portion is partially deflected by the refractive index grating to form a phase conjugate beam.

12. The method of claim 10, wherein:
    the photorefractive crystal is affixed to a vibrating body such that the photorefractive crystal vibrates with the vibrating body; and
    vibration of the crystal intensity modulates the laser beams in the photorefractive crystal.

13. The method of claim 12, wherein:
    at least one of the laser beams is directed into a photodetector for converting modulation of that laser beam into an electrical signal.

14. The method of claim 10, wherein:
    the photorefractive crystal is a class 4-mm crystal.

15. The method of claim 10, wherein:
    said laser beams are mixed contra-directionally within the photorefractive crystal.

16. The method of claim 10, wherein:
    said laser beams are directed into the photorefractive crystal generally along a "C" axis of the photorefractive crystal.

* * * * *